United States Patent
Haldric et al.

[11] Patent Number: 5,141,248
[45] Date of Patent: Aug. 25, 1992

[54] ROD WITH A REINFORCED CAPACITY FOR BUCKLING AND ITS APPLICATION IN PARTICULAR TO A MOTOR VEHICLE STEERING SYSTEMS

[75] Inventors: Bernard Haldric, Vendome; Laurent Fevre, Connerre; Luis Teixeira, Vendome, all of France

[73] Assignee: Nacam, Vendome, France

[21] Appl. No.: 592,512

[22] Filed: Oct. 4, 1990

[30] Foreign Application Priority Data
Oct. 12, 1989 [FR] France ............... 89 13351

[51] Int. Cl.⁵ ............................... B62D 1/19
[52] U.S. Cl. .................... 280/777; 180/271; 74/492; 188/371; 464/179
[58] Field of Search ........... 180/271; 280/777, 775; 74/492, 493; 188/371, 377; 52/729, 732; 464/179, 181

[56] References Cited

U.S. PATENT DOCUMENTS

| | | | |
|---|---|---|---|
| 2,114,663 | 4/1938 | Erickson | 180/78 |
| 2,432,622 | 12/1947 | Johnston | 52/729 |
| 3,373,629 | 3/1968 | Wight et al. | 280/777 |
| 3,396,599 | 8/1968 | Altmann | 74/492 |
| 3,468,182 | 9/1969 | Shwartzberg | 280/777 |
| 3,771,379 | 11/1973 | Rohrbach | 74/492 |
| 3,803,938 | 4/1974 | Bratke et al. | 74/492 |
| 3,813,961 | 6/1974 | Hug | 74/492 |
| 4,040,646 | 8/1977 | Becker | 74/492 |
| 4,223,763 | 9/1980 | Duclos et al. | 74/492 |
| 4,446,668 | 5/1984 | Christ-Janer | 52/729 |
| 4,730,508 | 3/1988 | Haldric et al. | 74/492 |

FOREIGN PATENT DOCUMENTS

| | | | |
|---|---|---|---|
| 2160849 | 6/1973 | Fed. Rep. of Germany | |
| 2336788 | 2/1975 | Fed. Rep. of Germany | 74/492 |
| 115459 | 10/1975 | Fed. Rep. of Germany | |
| 2212713 | 5/1977 | Fed. Rep. of Germany | |
| 3638161 | 5/1988 | Fed. Rep. of Germany | 74/492 |
| 2095674 | 2/1972 | France | |
| 2180189 | 11/1973 | France | |
| 96058 | 6/1984 | Japan | 74/492 |

Primary Examiner—Charles A. Marmor
Assistant Examiner—Tamara L. Graysay
Attorney, Agent, or Firm—Robert E. Burns; Emmanuel J. Lobato

[57] ABSTRACT

A rod with an increased capacity for buckling under length-wise load has a central portion bent in the form of an omega with a central bend joined to end portions by elbows. The cross-section of the central portion is formed, for example by plastic deformation, into the shape of a bow-tie or the mathematical symbol "infinity" which consists of two lateral lobes connected by a thin central core and which is inscribed in a rectangle of which the length is equal to at least twice its width. Such rod is used as a shaft in a motor vehicle safety steering column.

12 Claims, 6 Drawing Sheets

ROD WITH A REINFORCED CAPACITY FOR BUCKLING AND ITS APPLICATION IN PARTICULAR TO A MOTOR VEHICLE STEERING SYSTEMS

The present invention relates to rods with a particular moment of inertia and, more particularly, rods which are provided, at least locally, with a given moment of inertia which reinforces their capacity for buckling, and the use of such rods, in particular for motor vehicle steering columns.

As is known, when a rod is subjected to an axial compressive force, it may be deflected under load when this compression exceeds a certain threshold, in other words it is subjected to a buckling phenomenon. When such a rod is homogeneous and has a constant cross-section, the configuration which it tends to assume is a sine curve.

Although attempts are usually made to prevent this buckling phenomenon, there are cases where, on the contrary, it is desired to reinforce it.

For example, one instance of where a rod with a reinforced capacity for buckling is of considerable industrial advantage is that of motor vehicle steering columns so as to improve the safe driving conditions when a motor vehicle is subjected to a relatively violent impact with a substantial axial component. In such a situation, on the one hand the deformation of the front compartment of the vehicle, and the possible rearward displacement of the engine-gearbox unit, tend to be transmitted to the steering column, the shaft and steering-wheel of which are then likely to intrude into the passenger cell, moving towards the driver, and, on the other hand, the driver experiences a return shock which projects him towards the steering wheel. If special precautions are not taken, even when the driver is belted into his seat with a safety belt, he is likely to receive serious wounds or contusions as a result of the steering column penetrating into the passenger cell and striking the thorax and/or abdomen of the driver. For this reason, the authorities have laid down regulations and published technical standards.

In order to protect a driver from this type of danger, steering columns have already been proposed in which the shaft, usually in several sections joined by universal joints, is equipped with special safety devices which are designed to limit to a maximum value the permissible travel of the rearward displacement of the steering-wheel under a specified and predetermined frontal impact and/or in which the steering-wheel is equipped with energy absorbers.

Various types of safety devices have already been proposed. The principle of all these devices is to act such that the initial length of the steering column can be reduced in the event of impacts whose axial forces exceed a predetermined threshold. These devices make use, for example, of irreversible mechanical deformations, or alternatively of resistant sliding movements of the type which can be obtained using telescopic elements such as jacks or compressive elements such as helical springs, or even disconnectable couplings.

The essential function of such a safety device is to prevent the transmission to the steering-wheel of the displacement of the steering box inserted between the shaft of the column and the drag-link, and, where possible, to absorb the energy and in so doing contribute towards the overall absorption of the impact.

Prior art solutions of these various types are, for example, illustrated by the U.S. Pat. Nos. 2,114,663, 3,373,965, 3,396,599, 3,468,182, 3,771,379 and 3,803,938 and by the French Patent 2,095,674.

In the devices of this type which make use of friction contacts and/or deformations, it is necessary for a certain threshold to be exceeded above which the device operates. This threshold is, for example, determined by a pin which must first be broken by shearing and then, subsequently, less force needs to be exerted for the remainder of the travel. Such a solution often utilizes a relatively high number of components, some of which are wholly or partially made from synthetic materials which are particularly sensitive to the temperature peaks or to the torques not provided for by the specification. This means that a large number of parameters must be controlled in order to guarantee that the functioning of such a device can be reproduced. It is easy to conceive that the use of a large number of fragile components places considerable strain on manufacturing and fitting costs.

The objects of the invention are to create a rod, preferably in one piece, with a particular geometry so as to permit both the transmission of a high torque and a substantial longitudinal deformation, and to use such a rod, in particular for motor vehicle steering columns.

A rod according to the invention is such that when it is subjected to an axial compressive force and when this force goes beyond a given threshold, the buckling is triggered and then continues with deformation under a force of considerably lower intensity.

The subject of the invention is a rod with a reinforced capacity for buckling, characterized in that it comprises, between its ends, an intermediate zone with a cross-section which has a contour with an approximate "ball-of-wool" or "bow-tie" shape or, alternatively, even in the shape of the mathematical symbol "infinity", which is made from two lateral lobes joined by a central core and which is inscribed in a rectangle whose length is equal to at least twice the width and in which the ratio of the moduli of inertia relative to the centre and to the large axis of this rectangle, respectively, is equal to at least four.

The subject of the invention is also the application of such a rod to the making of a motor vehicle steering column of which it forms a shaft.

Other features of the invention will become apparent from reading the description below and upon examining the attached drawing, given merely by way of example, in which.

Since the working of materials in rod form, on the one hand, and motor vehicle steering columns, on the other hand, are well known from the prior art, in what follows only that which relates directly or indirectly to the invention will be described. For the remainder, the person skilled in the art in question will have recourse to the existing traditional solutions available to him in order to deal with the particular problems with which he is confronted.

A same reference number always designates an identical element, irrespective of the embodiment.

In what follows, a rod according to the invention will be described more particularly in its particular application to motor vehicle steering columns. It is clear that the invention is not limited to this particular application of such a rod with a reinforced capacity for buckling according to the invention.

As is known, a motor vehicle steering column usually comprises, inter alia, a steering-wheel in the passenger cell and a steering box in the front compartment which are connected to one another by a shaft, often made from different sections joined, usually, by universal joints. It is one of these sections which is formed by a rod 10 according to the invention which carries, at each of its ends 11, a universal joint 20. These universal joints 20 comprise, as is conventional, a core 21, yoke 22 and a trunnion 23 connecting the yoke. This is all standard and does not form part of the invention.

The cylindrical rod 10, with longitudinal axis Δ (delta), has a radius R or diameter D. Such a rod has an initial length L₀ (FIG. 1) and a length L after having undergone a buckling phenomenon (FIG. 2).

Figure 3:
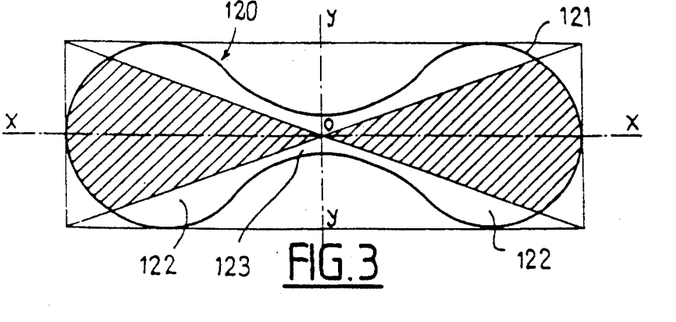
FIG. 3 is a cross-section of the intermediate zone of an embodiment of a rod according to the invention showing its particular configuration.

Between the ends 11, such a rod 10 has an intermediate zone 12. As can be seen, in particular in FIG. 3, this intermediate zone has a cross-section 120 inscribed in a rectangle whose large axis is designated by X—X and whose small axis by Y—Y, these two axes intersecting at a centre 0. As can be observed in particular in FIG. 3, this cross-section 120 is defined by a contour 121 with a particular configuration, approximately in a "ball-of-wool" or "bow-tie" shape, or even in the shape of the mathematical symbol "infinity". This cross-section has two lateral lobes 122 joined by a central core 123. As seen in FIG. 3, the lobes 122 are pear shaped. The contour of this cross-section 120 preferably has a centre of symmetry which coincides with the centre 0 of the rectangle in which this contour is inscribed.

According to the invention, this cross-section is such that its configuration in a "ball-of-wool" or "bow-tie" shape, or even in the shape of the mathematical symbol "infinity", is inscribed in a rectangle whose length is equal to at least twice the width and in which the ratio of the moduli of inertia relative to the centre O and relative to the large axis X—X of this rectangle, respectively, is equal to at least four. This contour preferably defines a surface of which at least 80% is included between the diagonals and the widths of this rectangle. This is illustrated by the hatching in FIG. 3.

Things are arranged such that the majority of this surface defined by the contour 121 is located in the lateral lobes 122, the remainder of this surface being contained in the central core 123 which is reduced to the very minimum required for manufacture. In principle and if it were physically possible, this central core 123 would consist of the centre 0 alone.

According to a particular embodiment (see FIGS. 1 and 2), this intermediate zone 12 is laterally offset by a given value d relative to the longitudinal axis Δ (delta). For example, this intermediate zone is curved and is like an omega-shaped or lyre-shaped bend 125 joined at each of its ends by an elbow 126 to ends 11 of the rod. It is clear that this omega-shaped or lyre-shaped configuration is not limiting and that others can be used. The amplitude of this curved intermediate zone 12, measured between these elbows 126, is equal to a and is laterally offset by a quantity d measured between the axis Δ (delta) and the position of the neutral axis at the topmost point of the bend 125, as is drawn, in particular, in FIG. 1.

In order to characterize the capacity of a rod to transmit a substantial torque whilst at the same time easily yielding under an axial load, we use the ratio $$K = (I_o/r)/(I_{xx}/v)$$

where $I_o$ designates the polar moment of inertia relative to the centre 0

$I_{xx}$ designates the moment of inertia relative to the axis X—X r designates the distance of the furthermost point from the centre 0 v designates the distance of the furthermost point from the axis X—X $I_o/r$ designates the polar modulus of inertia of centre 0

$I_{xx}/v$ designates the modulus of inertia relative to the axis X—X.

Whereas such a ratio equals two with traditional round rods since $I_o = D^4/32$, $I_{xx} = D^4/64$ and $r = v = D/2$, with a rod according to the invention it is possible to obtain a value of the order of four, which may even go up to or exceed ten.

In order to obtain a value for this ratio of the order of ten or eleven, the cross-section 120 of the intermediate zone 12 is inscribed in a rectangle whose length is of the order of four times its width.

The cross-section is included between the diagonals and the widths of the rectangle. For reasons of manufacture, the core is given a minimum non-zero thickness. It is possible, also in order to facilitate manufacture and to reduce the size in rotation, for example to chamfer the outer edges of the intermediate zone, in particular (see, for example, FIG. 7C). It is clear that other measures can also be taken without removing material. It is clear that "breaking" the edges in this way by chamfering them modifies to an extent the initial width of the rectangle in which the cross-section of the intermediate zone is inscribed but such a modification, minor in practice, has no significant consequence on the actual behaviour of a rod according to the invention.

In order to obtain a value for this ratio which exceeds ten and can even go up to eleven, the cross-section 120 of the intermediate zone 12 is inscribed in a rectangle whose length is at least of the order of four times its width and the central core 123 is given, for example, the approximate configuration of a rectangle elongated in the same direction as that in which the cross-section is inscribed. The particular length of the elongated rectangle of the central core is preferably of the order of three times its particular width, and the lateral lobes 122 are connected to the length of the elongated rectangle of the central core 123 with an inclination of the order of approximately 15°. In such an embodiment, the length of the rectangle in which the cross-section 120 is inscribed is of the order of five times the particular length of the elongated rectangle of the central core 123 (see FIG. 9A).

It is clear that the configuration of this core can have a different geometry. For example, as illustrated in FIG. 3, the large sides can be curved and their concavity turned towards the outside, or the peaks O of the hatched triangles in this figure can alternatively interpenetrate by one being moved translationally towards the other along the axis X—X so as to obtain a core with a lozenge configuration or one approximating to it.

It is possible to specify the force required in order to cause the rod to buckle by selecting the size of the lateral offset d.

Figure 4:
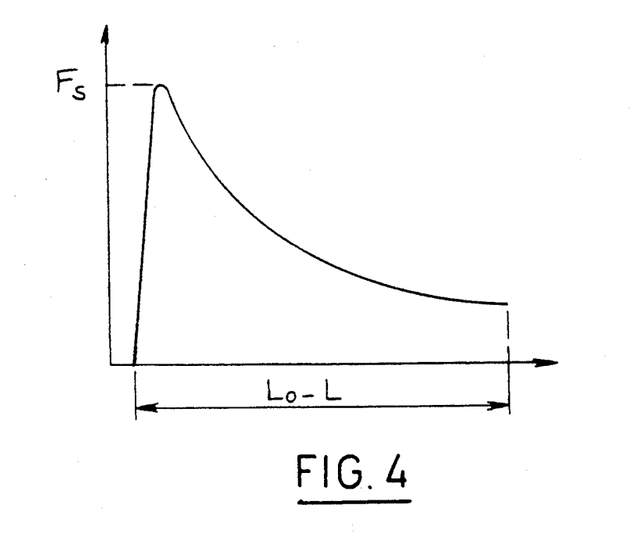
FIG. 4 is a graph illustrating the behaviour of a steering column section made from a rod according to the invention; the values for the travel or shortening of the initial length of the rod are plotted on the horizontal axis and the values of the axial compressive forces causing the buckling and the deformation are plotted on the vertical axis.

As indicated, the buckling of a rod according to the invention is triggered when it is subjected to an axial compressive force greater than a given value $F_s$ which is dependent only upon the modulus of inertia of the intermediate zone 12 and upon the lateral offset d of the material of the latter. Once this threshold $F_s$ is passed, the force which causes the deformation of the rod decreases rapidly during the whole of part b ($b=L_o-L$) of the travel (see FIGS. 4, 5 and 6). This partial travel b is a function only of the amplitude a of the intermediate curved zone 12. The choice of this distance a therefore enables, by design, the travel to be adjusted. During the buckling, the two elbows 126 come into contact and the initial amplitude is zero, as illustrated in FIG. 2.

Figure 5:
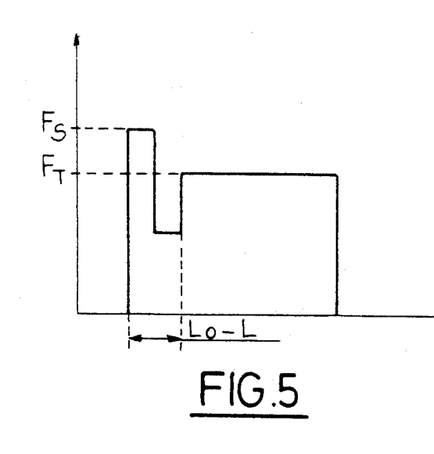
FIG. 5 is a graph illustrating the theoretical behaviour with which another embodiment of a steering column section must comply in order to make it capable of meeting the safety conditions: the values for the travel or shortening of the initial length of the rod are plotted on the horizontal axis and the values of the axial compressive forces causing the buckling and the deformation are plotted on the vertical axis.
Figure 6:
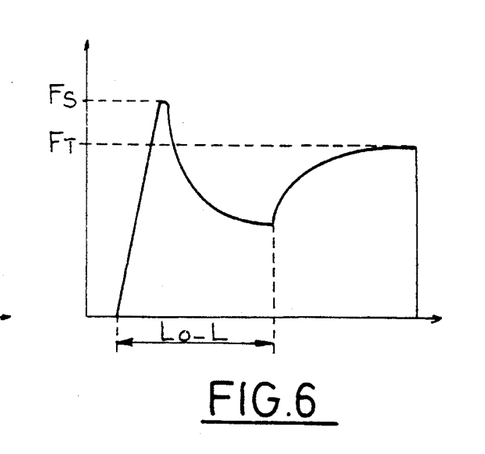
FIG. 6 is a graph similar to that in FIG. 5 of the actual behaviour of a rod according to the invention, used for a steering column section according to the invention.

The force required to shorten the rod 10 still more then increases and assumes a value $F_t$ less than $F_s$ which is dependent only upon the inertia of the cross-sections of the elbows 126 of the ends 11 of the rod 10 and upon the residual distance $d_1$ separating the two ends 11 of the rod 10 from its elbows 126 (see FIGS. 5 and 6). It will be observed that this distance $d_1$ is a function only of the amplitude a, of the axial offset d and of the initial length $L_o$ of the rod. Indeed, it can be immediately seen that $d_1$ is equal to $(L-a)/2.\cos\alpha$ (alpha) where $\alpha$ (alpha) = arctan a/2d. The complete value for the shortening travel is obtained when the two ends 11 touch each other, in other words when L is minimal.

It can therefore be seen that if the initial length $L_o$ of the rod is fixed, a single compression curve corresponds to each "quadruplet" of values $F_s$, $F_t$, (a) and $L_o$.

Reference will now be made to the various views in FIG. 7 or FIG. 8 in which another embodiment of the invention is illustrated.

Figure 1:
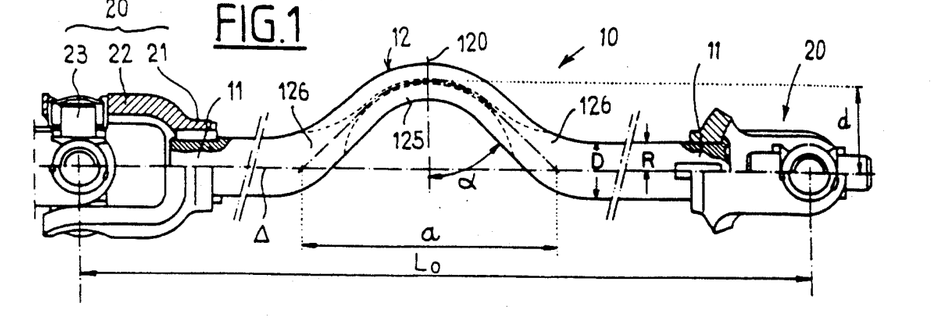
FIG. 1 is a view in elevation of an embodiment of a rod according to the invention applied to a motor vehicle steering system, in the normal state before buckling.
Figure 2:
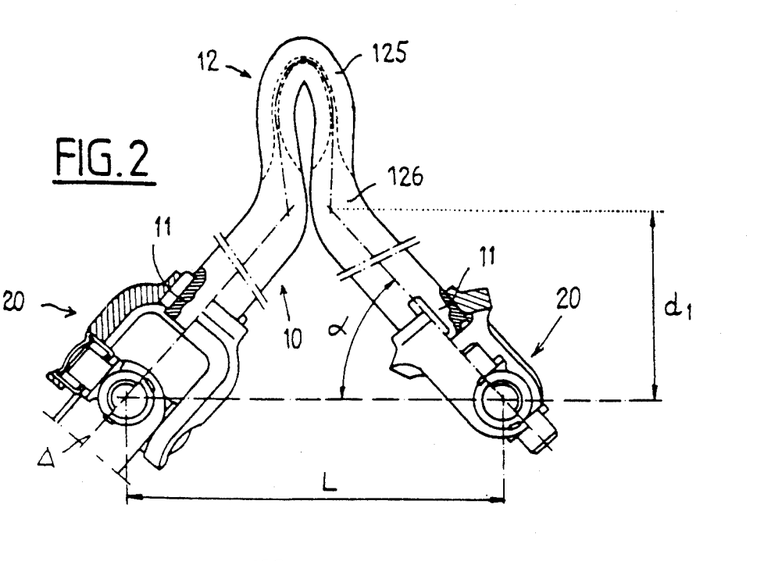
FIG. 2 is a view of the rod in FIG. 1 shown in the position which it occupies subsequent to deformation caused by an axial compressive force which has triggered its buckling.
Figure 7A:
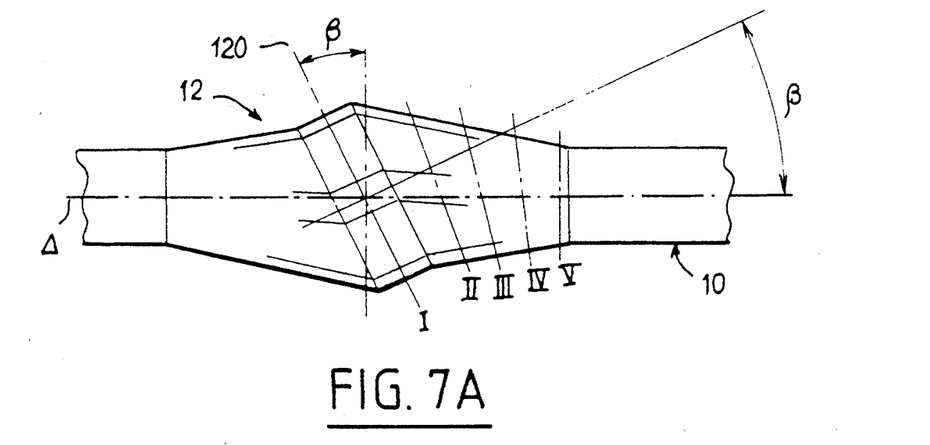
FIG. 7 is a representation of another embodiment of a rod according to the invention, in which a partial top view is illustrated in A, a partial view similar to that in FIG. 1 is illustrated in B, and various cross-sections, referenced by the numerals I to V corresponding to the planes carrying the same references in the views A and B, are illustrated in C.
Figure 7B:
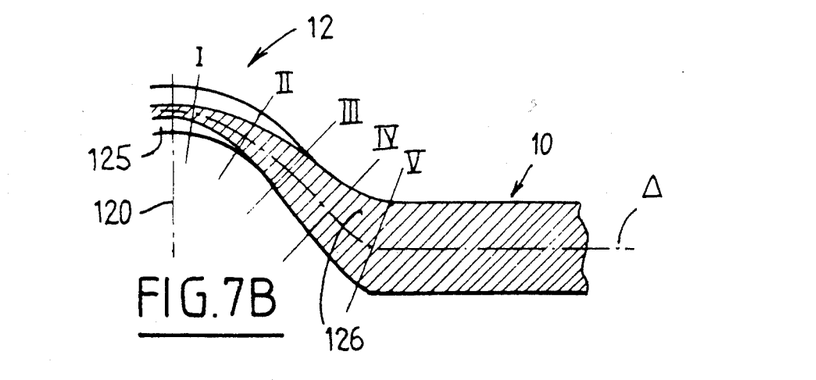
Figure 8A:
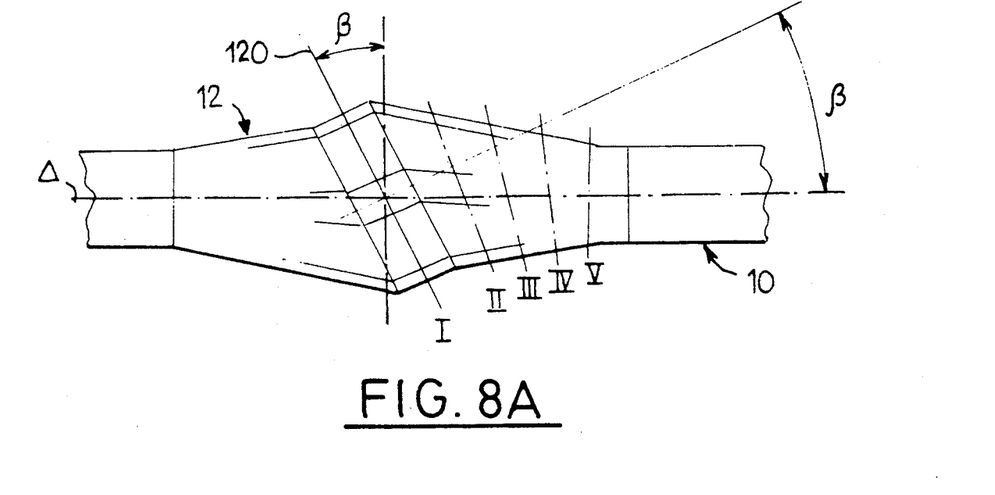
FIG. 8 and its views A, B and C, similar to the corresponding ones in FIG. 7, relate to an alternative embodiment.
Figure 8B:
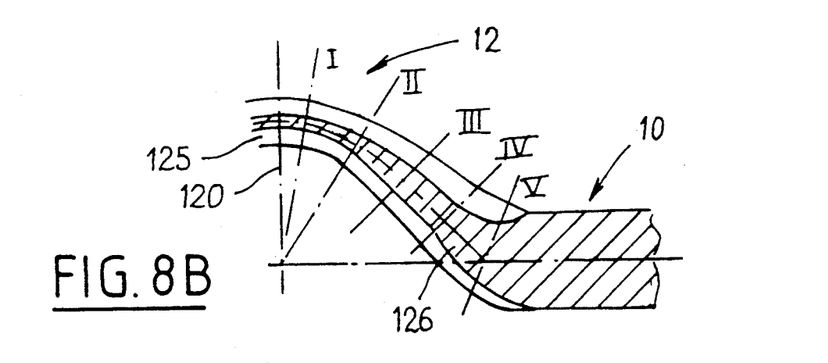

As can be seen here, in particular from FIG. 7B or 8B, this embodiment is, in its main features, similar to that drawn in FIG. 1. However, if FIG. 7A or 8A is observed closely, it can be noted that the intermediate zone 12 is tilted by a given angle $\beta$ (beta) relative to the longitudinal axis $\Delta$ (delta).

Such a tilting of the intermediate zone of a rod according to the invention enables a deformation travel to be obtained during buckling which is considerably longer than that achieved in the embodiment in FIG. 1. Indeed, at the end of deformation, the elbows 126 then "avoid each other", "slip past from each other" and, in certain circumstances, the yokes of the universal joints 20 cannot meet. It can therefore be understood that in such circumstances the amplitude of this deformation travel may then be greater than the initial length $L_o$ of the rod since the ends 11 "cross" to an extent.

In order to obtain such a rod according to the invention, the intermediate zone 12 is given a changing cross-section.

Figure 7C:
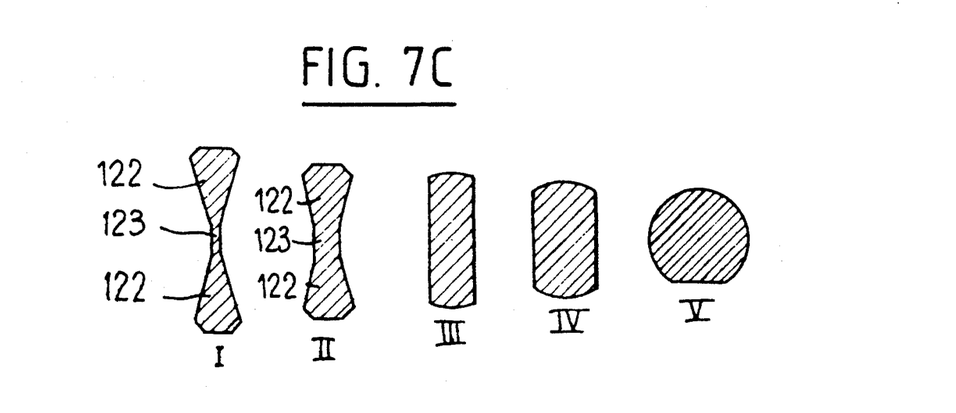
Figure 8C:
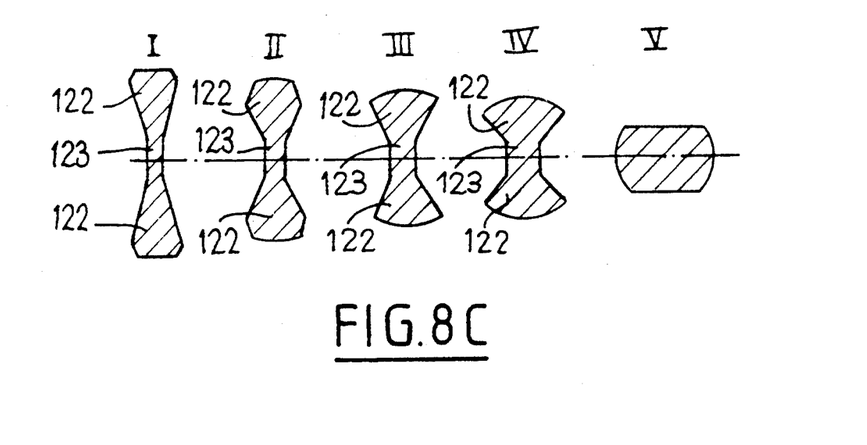

As can be noted for the embodiments in FIGS. 7C and 8C, this cross-section varies progressively from the contour 121 with an approximate ball-of-wool, bow-tie or "infinity" symbol shape to that of the rod. This is clearly apparent from the illustrations of the views A, B and C in FIG. 7 and FIG. 8.

Figure 9A:
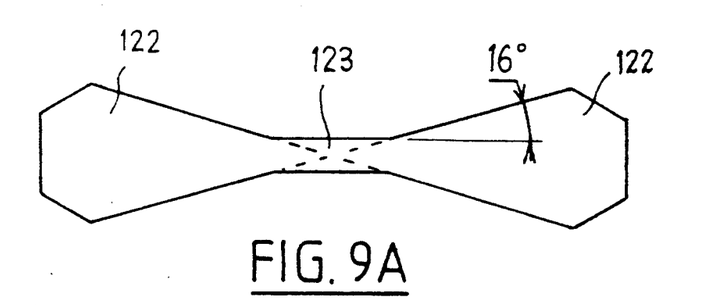
FIGS. 9A and 9B are detailed cross-sections, similar to those carrying the references I in the views 7C and 8C, of other alternative embodiments.
Figure 9B:
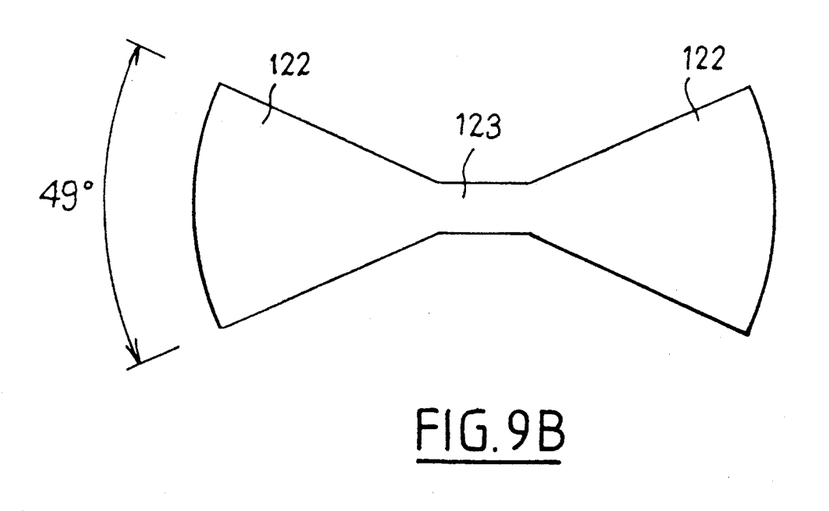

FIGS. 9A and 9B illustrate details of alternative embodiments. These views show cross-sections similar to those illustrated for the sections carrying the reference I in views 7C and 8C.

The manufacture of a rod according to the invention is effected, for example and preferably, by plastic deformation in a single operation which enables good reproducibility to be guaranteed and therefore long-term stability of the compression curve to be obtained over time.

In order to manufacture a rod according to the invention, a tool 30 is, for example, used made from a punch 31 and a die 32, each of which carries recessed and raised impressions corresponding, in particular, to the profile of the contour 121 of the cross-section 120 of the intermediate zone 12 to be obtained.

The special tool for implementing the invention enables the lyre-shaped or omega-shaped profile of the rod, and the particular cross-section 120, to be obtained in a single operation. Its special nature lies in the fact that the elongation of the rod in question in order to form the omega shape of lyre shape is supplied by the narrowing relative to the original circular cross-section of the cross-section 120. Only the cross-section 120, its distance d (and its possible inclination which will be dealt with later) are characteristic of the invention, as, where appropriate, are the cross-sections of the elbows 126. The bend 25, which can be an arc of a circle, can also take another form, for example an approximate V or U shape (inverted on the drawing) which is more or less splayed, more or less deep and more or less sharply angled but is linked to the mode of manufacture.

Figure 10:
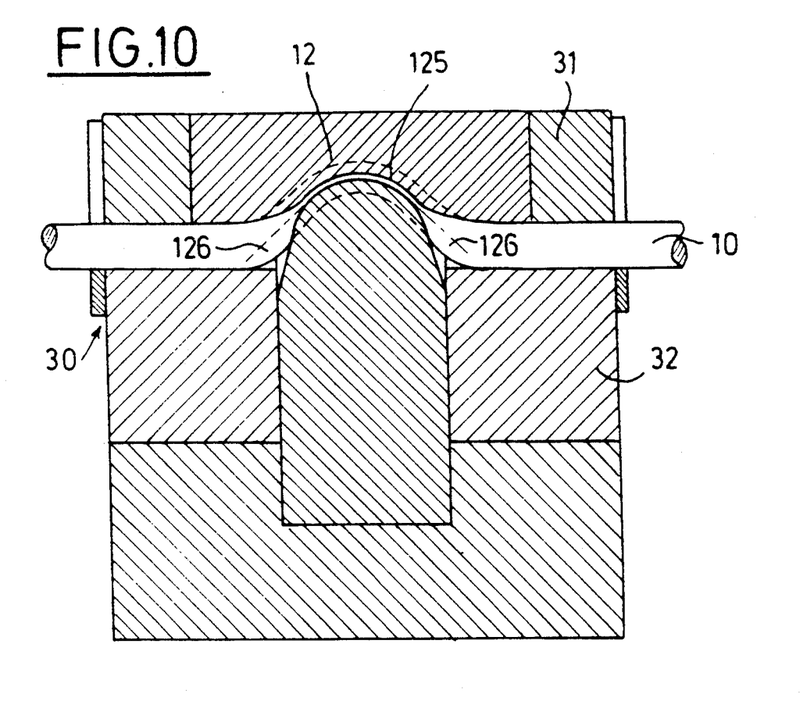
FIGS. 10 and 11 are diagrammatic cross-sections of machinery enabling the rods according to the invention to be produced.

Such a tool is, for example, illustrated diagrammatically in FIG. 10. As can be seen, if a rod of diameter D is used, the length of the tool which enables the curved intermediate zone 12 to be obtained is of the order of seven times this diameter. The bend 125 develops approximately in a quarter circle, extended by a straight-line part on each side equal to approximately half this diameter, before continuing with the elbows 126 which have a face, on the concave side, inclined to the axis Δ (delta) by approximately 15°. This is clearly apparent from FIG. 10.

Figure 11:
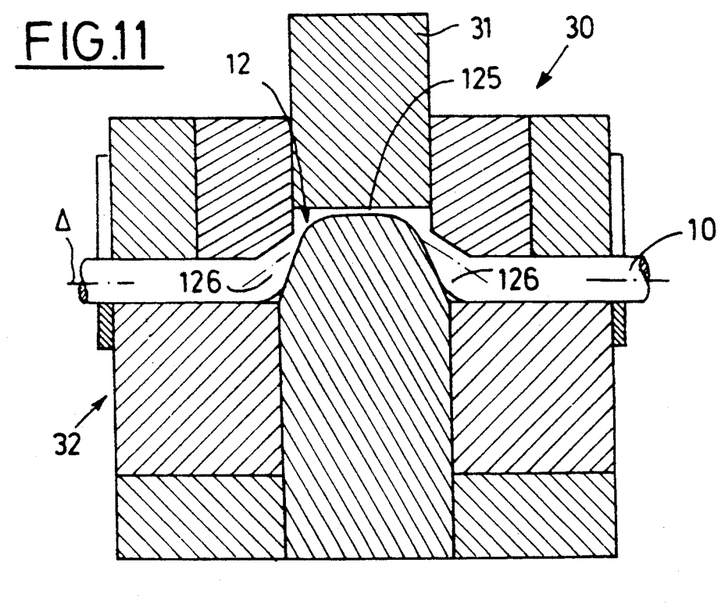

FIG. 11 illustrates another embodiment of such a tool.

It goes without saying that other tools and/or other techniques can also be used in order to manufacture a rod according to the invention.

If necessary, localized heat treatments, for example of the intermediate zone, enable the relative bending/torsion properties of the rod according to the invention to be adjusted.

It will be observed that it is also possible to obtain more complex deformation curves by using a cross-section 120 which is not symmetrical and cross-sections for the elbows 126 which are different and are or are not centred.

In order to obtain the rod according to the invention, it is possible to start from solid metal products.

The entire advantage of the invention can be immediately appreciated since, by using a single rod of a very special configuration, it is possible to obtain, virtually with a single operation, an element whose torque-transmission and buckling characteristics under axial compression can be easily controlled without there being any need to use a large number of complex components whose properties and assembly are difficult to control.

We claim:

1. Rod with a reinforced capacity for buckling, characterized in that it comprises, between its ends (11), an intermediate zone (12) with a solid cross-section (120) which has a contour (121) with an approximate "bow-tie" shape or in the shape of the mathematical symbol "infinity", which consists of two lateral lobes (122) connected by a central core (123) and which is inscribed in a rectangle whose length is equal to at least twice its width and in which the ratio of the moduli of inertia relative to the center (0) and to the large axis (X—X) of said rectangle, respectively, is equal to at least four, said rod constituting a shaft of a steering column of a motor vehicle and being provided at opposite ends with means for coupling said rod with adjacent parts of said steering column.

2. Rod according to claim 1, characterized in that said contour (121) defines a surface, the majority of which consists of said lateral lobes (122), said central core (123) being reduced to a minimum required for manufacture.

3. Rod according to claim 1, characterized in that said contour (121) defines a surface of which at least approximately 80% is included between diagonals and sides of said rectangle.

4. Rod according to claim 1, characterized in that the length of said rectangle is of the order of four times its width, said core (123) is in the approximate form of a rectangle elongated in the same direction as the rectangle in which said cross-section (120) is inscribed and whose length is of the order of three times its width, and in which the length of the rectangle in which said cross-section (120) is inscribed is of the order of five times the length of the elongated rectangle of said core (123).

5. Rod according to claim 1 or 4, characterized in that said cross-section (120) has a centre of symmetry coinciding with that (0) of the rectangle in which said cross section is inscribed.

6. Rod according to claim 1, characterized in that said cross-section (120) of said intermediate zone (12) changes from a contour (121) with an approximate, bow-tie or "infinity" symbol shape to a contour approximating to that of the ends (11) when one moves from said intermediate zone (12) towards said ends (11).

7. Rod according to claim 1, characterized in that said outer edges of said intermediate zone (12) are chamfered.

8. Rod with a reinforced capacity for buckling, said rod comprising between its ends, an intermediate zone with a solid cross-section which as a contour with an approximate "bow-tie" shape or in the shape of the mathematical symbol "infinity", which consists of two lateral lobes connected by a central core and which is inscribed in a rectangle whose length is equal to at least twice its width and in which the ratio of the moduli of inertia relative to the center (O) and to the large axis (X—X) of said rectangle, respectively, is equal to at least four, said rod having a longitudinal axis Δ(delta), characterized in that said intermediate zone is laterally offset by a given value (d) relative to said longitudinal axis (delta).

9. Rod with a reinforced capacity for buckling, said rod comprising between its ends, an intermediate zone with a solid cross-section which has a contour with an approximate "bow-tie" shape or in the shape of the mathematical symbol "infinity", which consists of two lateral lobes connected by a central core and which is inscribed in a rectangle whose length is equal to at least twice its width and in which the ratio of the moduli of inertia relative to the center (O) and to the large axis (X—X) of said rectangle, respectively, is equal to at least four, characterized in that said intermediate zone is curved in the shape of lyre or omega and has a central bend joined to the ends of said rod by elbows.

10. Rod with a reinforced capacity for buckling, said rod comprising between its ends, an intermediate zone with a solid cross-section which has a contour with an approximate "bow-tie" shape or in the shape of the mathematical symbol "infinity", which consists of two lateral lobes connected by a central core and which is inscribed in a rectangle whose length is equal to at least twice its width and in which the ratio of the moduli of inertia relative to the center (0) and to the large axis (X—X) of said rectangle respectively, is equal to at least four, said rod having a longitudinal axis (delta)characterized in that said intermediate zone is tilted by a given angle β(beta) relative to said longitudinal axis Δ(delta).

11. Rod according to any one of claims 6 to 7, characterized in that it constitutes a shaft of a steering column of a motor vehicle and is provided at opposite ends with means for coupling said rod with adjacent parts of said steering column.

12. A rod with increased capacity for buckling comprising straight end portions of circular cross-section axially aligned with one another and an intermediate portion bent i the form of a lyre with a curved central portion laterally offset from the axis of said end portions and joined with said end portions by elbow portions said central portion being deformed to a cross-sectional shape consisting of two pear-shaped lobes connected with one another by a central core and inscribed in a rectangle whose length is at least twice its width.

the cross-sectional shape of said rod changing progressively in said elbow portion from the cross-sectional shaped of said central portion to the cross-sectional shape of said end portions.

* * * * *